United States Patent
Durbecq et al.

(10) Patent No.: US 12,466,231 B2
(45) Date of Patent: Nov. 11, 2025

(54) COOLING MODULE FOR AN ELECTRIC OR HYBRID MOTOR VEHICLE, COMPRISING A TANGENTIAL-FLOW TURBOMACHINE

(71) Applicant: VALEO SYSTEMES THERMIQUES, La Verriere (FR)

(72) Inventors: Gael Durbecq, La Verriere (FR); Amrid Mammeri, La Verriere (FR); Erwan Etienne, La Verriere (FR); Kamel Azzouz, La Verriere (FR)

(73) Assignee: VALEO SYSTEMES THERMIQUES, La Verriere (FR)

(*) Notice: Subject to any disclaimer, the term of this patent is extended or adjusted under 35 U.S.C. 154(b) by 298 days.

(21) Appl. No.: 17/998,306

(22) PCT Filed: Apr. 19, 2021

(86) PCT No.: PCT/EP2021/060044
§ 371 (c)(1),
(2) Date: Nov. 9, 2022

(87) PCT Pub. No.: WO2021/228495
PCT Pub. Date: Nov. 18, 2021

(65) Prior Publication Data
US 2023/0173875 A1 Jun. 8, 2023

(30) Foreign Application Priority Data
May 12, 2020 (FR) ........................................ 2004662

(51) Int. Cl.
*B60H 1/00* (2006.01)
*B60K 11/08* (2006.01)
*F01P 5/06* (2006.01)

(52) U.S. Cl.
CPC ..... *B60H 1/00392* (2013.01); *B60H 1/00899* (2013.01); *B60K 11/085* (2013.01); *F01P 5/06* (2013.01)

(58) Field of Classification Search
CPC ............ B60H 1/00849; B60H 1/00864; B60H 1/00842; B60H 1/00464; B60H 1/00471;
(Continued)

(56) References Cited

U.S. PATENT DOCUMENTS

2005/0023057 A1 2/2005 Maeda et al.
2018/0312039 A1* 11/2018 Sakane .............. B60H 1/00864

FOREIGN PATENT DOCUMENTS

DE 102011013856 A1 9/2012
EP 2875979 A1 5/2015
(Continued)

OTHER PUBLICATIONS

Editors of the American Heritage Dictionaries (Ed.). (2016). Assembly. In The American Heritage(R) Dictionary of the English Language (6th ed.). Houghton Mifflin. https://search.credoreference.com/articles/Qm9va0FydGljbGU6NDM4NjUxOA==?aid=279753.*

(Continued)

*Primary Examiner* — Tavia Sullens
(74) *Attorney, Agent, or Firm* — Osha Bergman Watanabe & Burton LLP

(57) ABSTRACT

A cooling module for an electric or hybrid motor vehicle, through which an air flow is intended to pass, having a set of heat exchangers including a first heat exchanger and a second heat exchanger; a fan casing disposed downstream, the fan casing having an outlet for the air flow; a tangential turbomachine configured so as to generate the air flow; the cooling module further including: an air discharge vent disposed downstream of the outlet for the air flow of the fan (Continued)

casing; and a bypass connecting the outlet for the air flow to an opening upstream of the set of heat exchangers; the air discharge vent having a closure device configured so as to redirect the air flow from the outlet towards the outside of the vehicle when in the discharge position and to redirect the air flow towards the bypass when in the recirculation position.

10 Claims, 4 Drawing Sheets

(58) Field of Classification Search
CPC ............ B60H 1/00457; B60H 1/00899; B60H 1/00392; B60K 11/085; B60K 11/08; F01P 5/06
See application file for complete search history.

(56) References Cited

FOREIGN PATENT DOCUMENTS

FR        3057814 A1 *  4/2018  ......... B60H 1/00328
JP     2001090538 A  *  4/2001

OTHER PUBLICATIONS

European Patent Office, International Search Report (with English translation) and Written Opinion of corresponding International Application No. PCT/EP2021/060044, dated Jun. 28, 2021.

* cited by examiner

COOLING MODULE FOR AN ELECTRIC OR HYBRID MOTOR VEHICLE, COMPRISING A TANGENTIAL-FLOW TURBOMACHINE

CROSS-REFERENCE TO RELATED APPLICATIONS

This application is filed under 35 U.S.C. § 371 U.S. National Phase of International Application No. PCT/EP2021/060044 filed Apr. 19, 2021 (published as WO2021228495), which claims priority benefit to French Application No. 2004662 filed on May 12, 2020, the disclosures of which are herein incorporated by reference in their entirety.

TECHNICAL FIELD

The present invention relates to a cooling module for an electric or hybrid motor vehicle, comprising a tangential-flow turbomachine.

BACKGROUND OF THE INVENTION

A cooling module (or heat exchange module) of a motor vehicle conventionally has at least one heat exchanger and a ventilation device that is designed to generate an air flow in contact with the at least one heat exchanger. The ventilation device thus makes it possible, for example, to generate an air flow in contact with the heat exchanger, when the vehicle is stationary or running at low speed.

In motor vehicles with a conventional combustion engine, the at least one heat exchanger has a substantially square shape, with the ventilation device then being a blower-wheel fan, the diameter of which is substantially equal to the side of the square formed by the heat exchanger.

Conventionally, the heat exchanger is then placed opposite at least two cooling openings formed in the front face of the body of the motor vehicle. A first cooling opening is situated above the bumper, while a second opening is situated below the bumper. Such a configuration is preferred since the combustion engine also has to be supplied with air, the air intake of the engine being conventionally situated in the passage of the air flow passing through the upper cooling opening.

However, electric vehicles are preferably only provided with cooling openings situated beneath the bumper, more preferably with a single cooling opening situated beneath the bumper.

Specifically, the electric motor does not need to be supplied with air. Furthermore, the reduction in the number of cooling openings allows the aerodynamic characteristics of the electric vehicle to be improved. This also results in better autonomy and a higher top speed of the motor vehicle.

In general, at least one of the heat exchangers is connected to a heat pump or to an air-conditioning circuit that is able to operate in a heat pump mode. This heat exchanger can then operate as an evaporator in order to absorb energy from the outside air. However, in cold weather, moisture from the outside air can condense and frost on this heat exchanger. This layer of frost can thus obstruct the circulation of the outside air and reduce the efficiency of this heat exchanger.

BRIEF SUMMARY OF THE INVENTION

The aim of the present invention is therefore to at least partially overcome the disadvantages of the prior art and to propose an improved cooling module that makes it possible to remove the frost that can accumulate on a heat exchanger operating as an evaporator.

The present invention therefore relates to a cooling module for an electric or hybrid motor vehicle, said cooling module being intended to have an air flow passing through it and having:
  a set of heat exchangers having a first heat exchanger configured to absorb heat energy from the air flow and a second heat exchanger configured to release heat energy into the air flow,
  a first header housing disposed downstream of the set of heat exchangers in the direction of circulation of the air flow, said first header housing having an outlet for the air flow,
  a tangential-flow turbomachine configured so as to generate the air flow,
  the cooling module also having:
  an air evacuation assembly disposed downstream of the outlet for the air flow of the first header housing, said air evacuation assembly emerging outside the vehicle, and
  a bypass connecting the air evacuation assembly to an opening emerging upstream of the set of heat exchangers,
  the air evacuation assembly having a first shut-off device that is able to move between a first position, known as the evacuation position, and a second position, known as the recirculation position, said first shut-off device being configured to redirect the air flow coming from the outlet toward the outside of the vehicle in its evacuation position and to redirect said air flow toward the bypass in its recirculation position.

According to one aspect of the invention, in the evacuation position, the first shut-off device shuts off the bypass.

According to another aspect of the invention, the cooling module also has a second header housing disposed upstream of the set of heat exchangers, said second header housing having a first inlet for the air flow coming from outside the vehicle and a second inlet for the air flow coming from the bypass forming the opening of the bypass.

According to another aspect of the invention, the second inlet of the second header housing has a second shut-off device that is able to move between a first position, known as the opening position, and a second position, known as the closing position, the second shut-off device being configured to redirect the air flow coming from the bypass toward the set of heat exchangers in its opening position and configured to shut off the second inlet in its closing position.

According to another aspect of the invention, the first inlet for the air flow of the second header housing has a front face shut-off device that is able to move between a first position, known as the open position, and a second position, known as the shut-off position, the front face shut-off device being configured to allow the air flow coming from outside the vehicle to pass through said first inlet in its open position and shut off said first inlet in its shut-off position.

According to another aspect of the invention, the set of heat exchangers has a third heat exchanger configured to release heat energy into the air flow.

According to another aspect of the invention, the third heat exchanger is disposed upstream of the first heat exchanger.

According to another aspect of the invention, the second heat exchanger is disposed downstream of the first heat exchanger.

According to another aspect of the invention, the first header housing has at least one discharge flap disposed facing the set of heat exchangers along the axis of circulation of the air flow passing through it.

According to another aspect of the invention, the air evacuation assembly is disposed along the same axis as the outlet for the flow of air of the first header housing.

BRIEF DESCRIPTION OF THE DRAWINGS

Further features and advantages of the present invention will become more clearly apparent from reading the following description, which is provided by way of non-limiting illustration, and with reference to the accompanying drawings, in which.

DETAILED DESCRIPTION OF THE INVENTION

In the various figures, identical elements bear the same reference numbers.

The following embodiments are examples. Although the description refers to one or more embodiments, this does not necessarily mean that each reference relates to the same embodiment, or that the features apply only to a single embodiment. Individual features of different embodiments can also be combined and/or interchanged in order to provide other embodiments.

In the present description, certain elements or parameters can be indexed, such as, for example, first element or second element and also first parameter and second parameter or else first criterion and second criterion, etc. In this case, what is concerned is a simple indexing to differentiate and denominate elements or parameters or criteria that are similar but not identical. This indexing does not imply a priority of one element, parameter or criterion with respect to another and such denominations can easily be interchanged without departing from the scope of the present description. Neither does this indexing imply any chronological order for example in assessing any given criterion.

In the present description, "placed upstream" is understood to mean that an element is placed before another with respect to the direction of circulation of an air flow. By contrast, "placed downstream" is understood to mean that an element is placed after another with respect to the direction of circulation of the air flow.

In FIGS. 1 to 4, an XYZ trihedron is depicted in order to define the orientation of the various elements relative to one another. A first direction, denoted X, corresponds to a longitudinal direction of the vehicle. It also corresponds to the direction of forward movement of the vehicle. A second direction, denoted Y, is a lateral or transverse direction. Finally, a third direction, denoted Z, is vertical. The directions X, Y, Z are orthogonal in pairs.

In FIGS. 1 to 4, the cooling module according to the present invention is illustrated in an operational position, i.e. when it is disposed within a motor vehicle.

Figure 1:
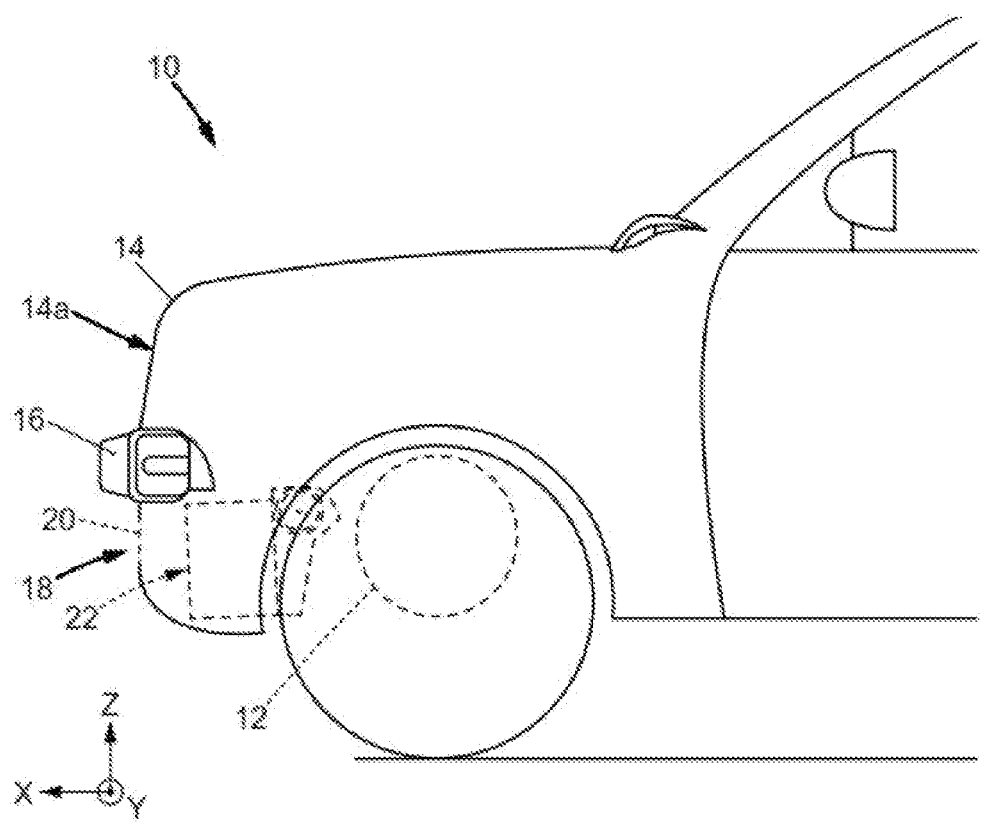
FIG. 1 shows a schematic depiction of the front of a motor vehicle in side view.

FIG. 1 schematically illustrates the front part of an electric or hybrid motor vehicle 10 that can have an electric motor 12. The vehicle 10 has in particular a body 14 and a bumper 16 that are borne by a chassis (not shown) of the motor vehicle 10. The body 14 defines a cooling opening 18, i.e. an opening through the body 14. In this case, there is only one cooling opening 18. This cooling opening 18 is preferably in the bottom part of the front face 14a of the body 14. In the example illustrated, the cooling opening 18 is situated beneath the bumper 16. A grille 20 can be disposed in the cooling opening 18 to prevent projectiles from being able to pass through the cooling opening 18. A cooling module 22 is disposed facing the cooling opening 18. The grille 20 makes it possible in particular to protect this cooling module 22.

Figure 2:
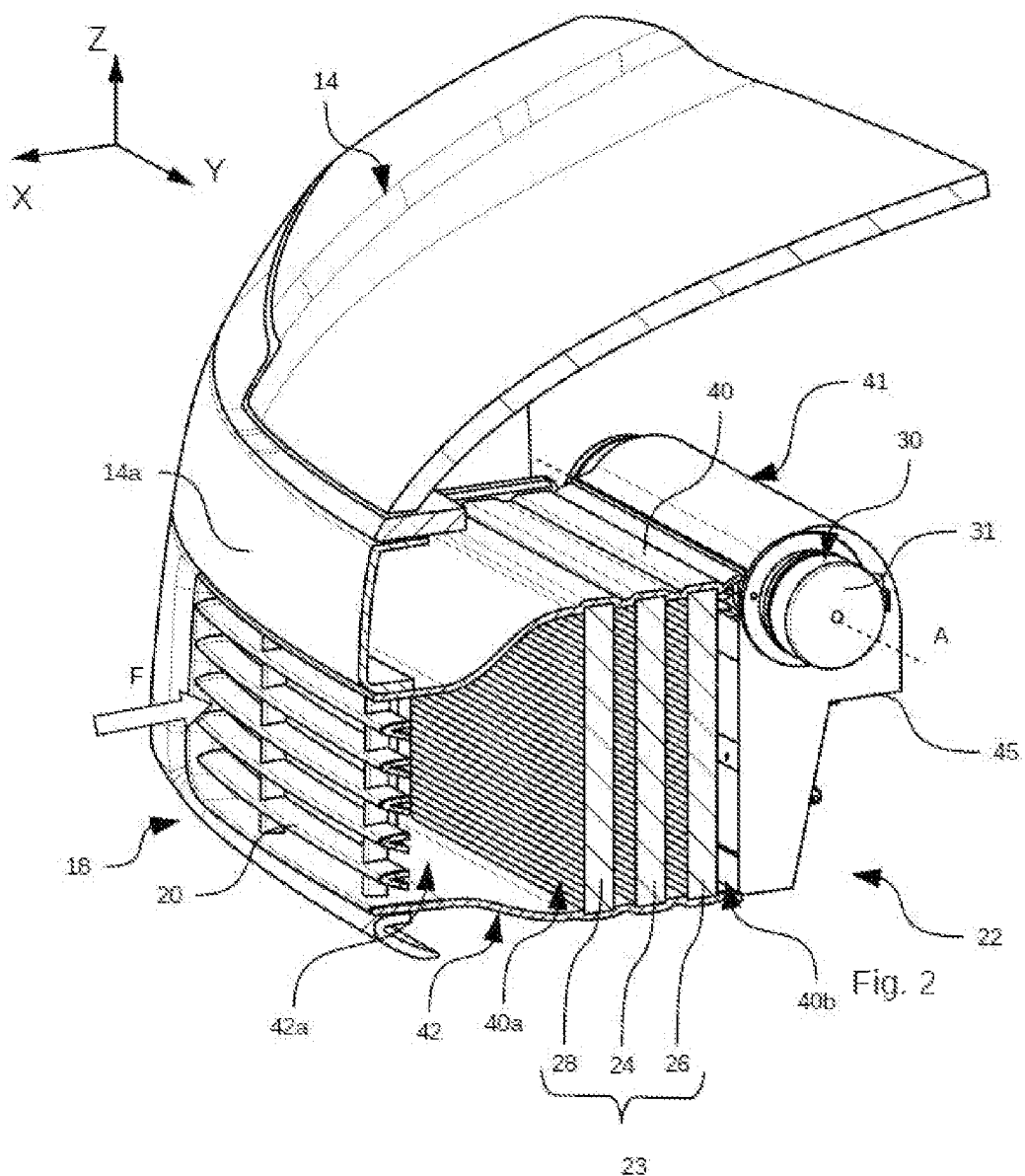
FIG. 2 shows a schematic perspective depiction in partial cross section of the front of a motor vehicle and of a cooling module.
Figure 3:
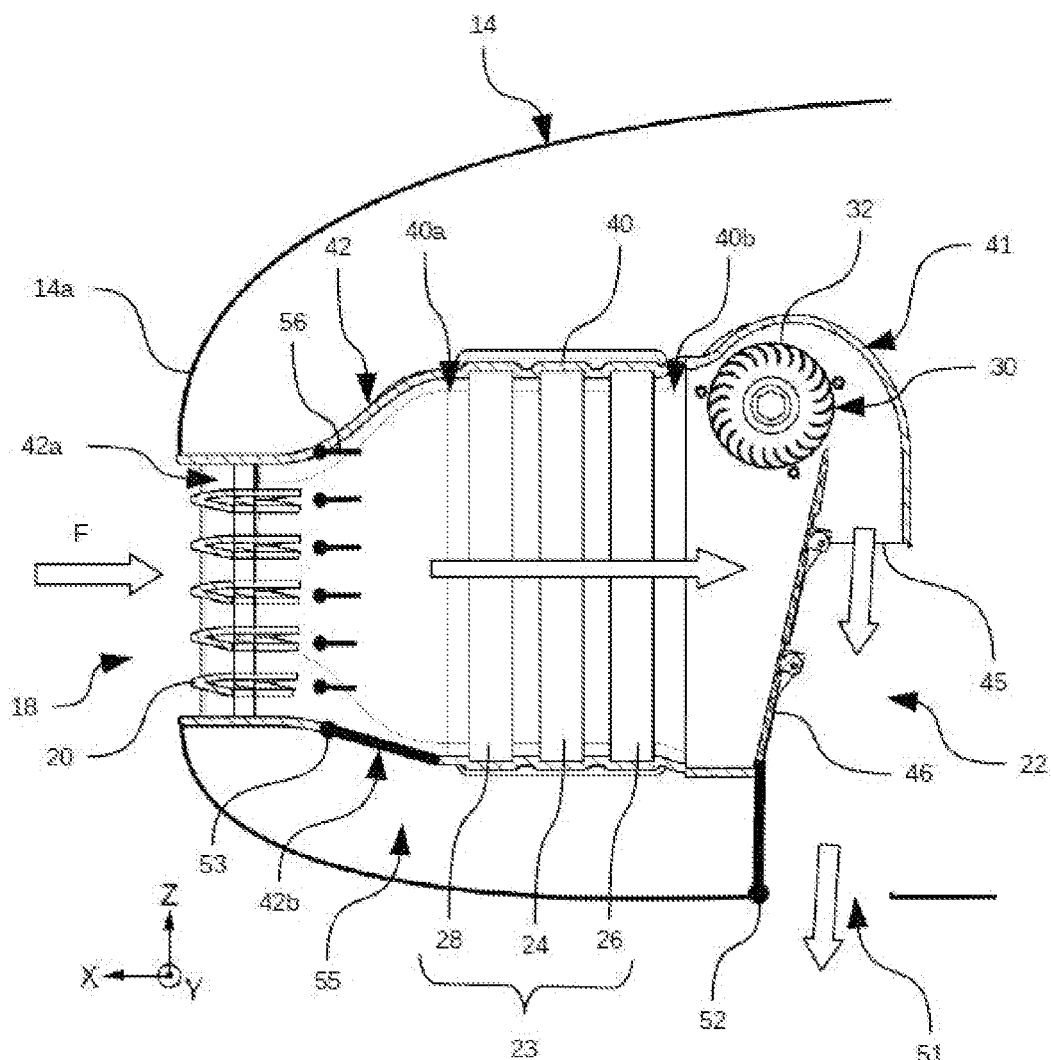
FIG. 3 shows a schematic depiction in cross section of the front of a motor vehicle and of a cooling module according to a first mode of operation.
Figure 4:
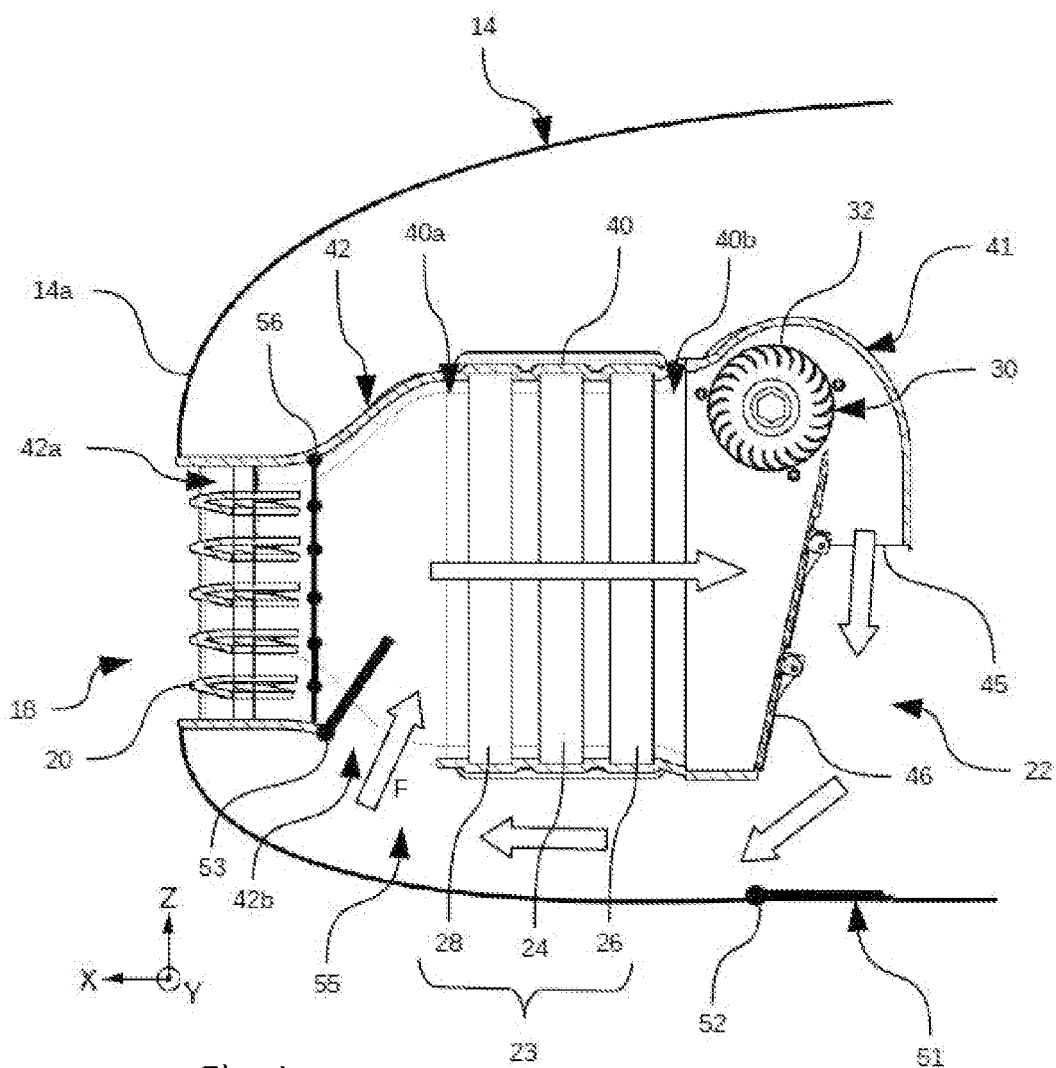
FIG. 4 shows a schematic depiction in cross section of the front of a motor vehicle and of a cooling module according to a second mode of operation.

As shown in FIGS. 2 to 4, the cooling module 22 is intended to have an air flow F passing through it, parallel to the X direction and going from the front toward the rear of the vehicle 10. The cooling module 22 comprises a set of heat exchangers 23. This set of heat exchangers 23 has at least a first heat exchanger 24 and a second heat exchanger 26.

The first heat exchanger 24 is in particular configured to absorb heat energy from the air flow F. This first heat exchanger 24 can more particularly be an evaporator of a heat pump (not shown) or an evaporator-condenser of a reversible air-conditioning circuit (not shown) that is able to operate in a heat pump mode. This reversible air-conditioning circuit can also allow the cooling of the batteries of the vehicle 10.

The second heat exchanger 26 is for its part configured to release heat energy into the air flow F. This second heat exchanger 26 can more particularly be a radiator connected to a thermal management circuit (not shown) for electric elements such as the electric motor 12.

Since the first heat exchanger 24 is generally an evaporator-condenser of a reversible air-conditioning circuit, the latter needs the air flow F to be as "fresh" as possible in air-conditioning mode. For this, the second heat exchanger 26 is preferably disposed downstream of the first heat exchanger 24 in the direction of circulation of the air flow F. It is nevertheless entirely possible to imagine that the second heat exchanger 26 is disposed upstream of the first heat exchanger 24.

In the example illustrated in FIGS. 2 to 4, the set of heat exchangers 23 has a third heat exchanger 28 that is also configured to release heat energy into the air flow. This third heat exchanger 28 can more particularly be a radiator connected to a thermal management circuit (not shown), which can be separate from that connected to the second heat exchanger 26, for electric elements such as the power electronics. It is also entirely possible to imagine that the second heat exchanger 26 and the third heat exchanger 28 are connected to a single thermal management circuit, for example connected in parallel with one another.

Still according to the example illustrated in FIGS. 2 to 4, the second heat exchanger 26 is disposed downstream of the first heat exchanger 24 while the third heat exchanger 28 is disposed upstream of the first heat exchanger 24. Other configurations can nevertheless be envisaged, such as for example the second heat exchanger 26 and third heat exchanger 28 being both disposed downstream or upstream of the first heat exchanger 24.

According to the embodiment illustrated, each of the heat exchangers 24, 26, 28 has a parallelepipedal overall shape that is determined by a length, a thickness and a height. The length extends in the Y direction, the thickness in the X direction and the height in the Z direction.

The cooling module 22 essentially has a housing or fairing 40 forming an internal channel between two opposite ends 40*a*, 40*b* and inside which the set of heat exchangers 23 is disposed. This internal channel is preferably oriented parallel to the X direction such that the upstream end 40*a* is oriented toward the front of the vehicle 10, opposite the cooling opening 18, and such that the downstream end 40*b* is oriented toward the rear of the vehicle 10.

The cooling module 22 also has a first header housing 41 disposed downstream of the set of heat exchangers 23 in the direction of circulation of the air flow. This first header housing 41 has an outlet 45 for the air flow F. This first header housing 41 thus makes it possible to recover the air flow passing through the set of heat exchangers 23 and to orient this air flow toward the outlet 45. The first header housing 41 can be integral with the fairing 40 or else be an attached component fastened to the downstream end 40*b* of said fairing 40.

The cooling module 22 also has an air evacuation assembly 51 disposed downstream of the outlet 45 for the air flow F of the first header housing 41. This air evacuation assembly 51 emerges outside the vehicle 10. The cooling module 22 also has a bypass 55 connecting the air evacuation assembly 51 to an opening 42*b* emerging upstream of the set of heat exchangers 23. This bypass 55 can for example be a channel disposed on the periphery of the cooling module 22 connecting the air evacuation assembly 51 to the upstream side of the set of heat exchangers 23.

The air evacuation assembly 51 more particularly has a first shut-off device 52 that is able to move between a first position, known as the evacuation position, and a second position, known as the recirculation position. This first shut-off device 52 is configured to redirect the air flow F coming from the outlet 45 toward the outside of the vehicle 10 in its evacuation position (illustrated in FIG. 3) and to redirect the air flow F coming from the outlet 45 toward the bypass 55 in its recirculation position (illustrated in FIG. 4).

This particular configuration thus makes it possible to evacuate the air that has passed through the set of heat exchangers 23 toward the outside via the air evacuation assembly 51 when the first shut-off device 52 is in its evacuation position.

In its recirculation position, the shut-off device allows a redirection of at least part of the air flow F coming from the outlet 45 toward the upstream side of the set of heat exchangers 23. This is particularly advantageous in cold weather when the first heat exchanger 24 is coupled to a heat pump or to an air-conditioning circuit operating in heat pump mode and acts as an evaporator. Specifically, when the first heat exchanger 24 acts as an evaporator in cold weather, moisture in the air can condense on the first heat exchanger 24 and frost. The air flow F that has passed through the set of heat exchangers 23, and therefore that has passed through the second heat exchanger 26, is potentially hotter than the air flow F coming from outside the vehicle 10. The recirculated air flow F can thus make it possible to melt the frost that has formed on the first heat exchanger 24. This is particularly effective when the second heat exchanger 26 is disposed downstream of the first heat exchanger 24.

The first shut-off device 52 can in particular be configured to shut off the bypass 55 in its evacuation position such that all of the air flow F coming from the outlet 45 is redirected toward the air evacuation assembly 51. The first shut-off device 52 can for example be a flag flap as illustrated in FIGS. 3 and 4. It can also be another type of flap known to those skilled in the art and able to perform the same function, such as for example a flap known as a butterfly flap or else a drum flap.

In order to make the circulation of the air flow easier, in particular when the first shut-off device 52 is in its evacuation position, the air evacuation assembly 51 is preferably disposed along the same axis as the outlet for the flow of air 45 of the first header housing 41.

The first header housing 41 can also have at least one discharge flap 46 disposed opposite the set of heat exchangers 23 along the axis of circulation of the air flow F passing through it. In FIGS. 3 and 4, the first header housing 41 more precisely has two discharge flaps 46. This allows the air flow to pass through the first header housing 41 without passing through the outlet 45 in the case of an air flow F with a high flow rate, for example when the motor vehicle is running beyond a certain speed.

The cooling module 22 also comprises at least one tangential-flow fan, also called tangential-flow turbomachine 30, configured so as to generate the air flow F intended for the set of heat exchangers 23. The tangential-flow turbomachine 30 comprises a rotor or turbine 32 (or tangential blower-wheel). The turbine 32 has a substantially cylindrical shape. The turbine 32 advantageously has several stages of blades (or vanes), which are visible in FIGS. 3 and 4. The turbine 32 is mounted so as to be able to rotate about an axis of rotation A, which is for example parallel to the Y direction. The diameter of the turbine 32 is for example between 35 mm and 200 mm so as to limit its size. The turbomachine 28 is thus compact.

The tangential-flow turbomachine 30 can also have a motor 31 (visible in FIG. 2) configured to set the turbine 32 in rotation. The motor 31 is for example designed to drive the turbine 32 in rotation at a speed of between 200 rpm and 14 000 rpm. This makes it possible in particular to limit the noise generated by the tangential-flow turbomachine 30.

The tangential-flow turbomachine 30 is preferably disposed in the first header housing 41. The tangential-flow turbomachine 30 is then configured to draw in air in order to generate the air flow F passing through the set of heat exchangers 23. The first header housing 41 then forms a volute at the center of which the turbine 32 is disposed and from which the evacuation of air at the outlet 45 of the first header housing 41 allows the air flow F to exit.

In the example illustrated in FIGS. 2 to 4, the tangential-flow turbomachine 30 is in a high position, in particular in the upper third of the first header housing 41, preferably in the upper quarter of the first header housing 41. This makes it possible in particular to protect the tangential-flow turbomachine in the event of submersion, and/or to limit the space taken up by the cooling module 22 in its bottom part.

It is nevertheless possible to imagine that the tangential-flow turbomachine 30 is in a low position, in particular in the lower third of the first header housing 41. This would make it possible to limit the space taken up by the cooling module 22 in its top part. Alternatively, the tangential-flow turbomachine 30 can be in a median position, in particular the middle third of the height of the first header housing 41, for example for reasons of integration of the cooling module 22 into its surroundings.

Furthermore, in the examples illustrated, the tangential-flow turbomachine 30 operates by suction, i.e. it draws in ambient air so that it passes through the set of heat exchangers 23. Alternatively, the tangential-flow turbomachine 30 can operate by blowing, blowing the air toward the set of heat exchangers 23. For this, the tangential-flow turbomachine 30 will be disposed upstream of the set of heat exchangers 23.

The cooling module 22 can also have a second header housing 42 disposed upstream of the set of heat exchangers 23. This second header housing 42 has a first inlet 42*a* for the air flow F coming from outside the vehicle 10 and a second inlet for the air flow F coming from the bypass 55 forming the opening 42*b* of the bypass 55. The first inlet 42*a* can in particular be disposed opposite the cooling opening 18. This first inlet 42*a* can also have the protective grille 20. The second header housing 42 can be integral with the fairing 40 or else be an attached component fastened to the upstream end 40*a* of said fairing 40.

In addition, the first inlet 42*a* of the second header housing 42 can have a front face shut-off device 56 that is able to move between a first position, known as the open position, and a second position, known as the shut-off position. This front face shut-off device 56 is in particular configured to allow the air flow F coming from outside the vehicle 10 to pass through said first inlet 42*a* in its open position (illustrated in FIG. 3) and to shut-off said first inlet 42*a* for the air flow in its shut-off position (illustrated in FIG. 4). The front face shut-off device 56 is in particular configured to be in its shut-off position when the first shut-off device 52 is in its recirculation position. Thus, in this scenario, only the recirculated air flow F coming from the bypass 55 passes through the set of heat exchangers 23, and this reinforces the defrosting effect.

The front face shut-off device 56 can take various forms, such as, for example, the form of a plurality of flaps mounted so as to be able to pivot between an opening position and a closing position. In the embodiment illustrated in FIGS. 3 and 4, the flaps are mounted parallel to the Y direction. However, it is entirely possible to imagine other configurations such as, for example, flaps mounted parallel to the Z direction. The flaps illustrated are flaps of the flag type but other types of flaps such as butterfly flaps are entirely conceivable.

The second inlet 42*b* of the second header housing 42 can for its part be in the form of an opening made in the wall of the second header housing 42 and into which the bypass 55 emerges. This second inlet 42*b* can have a second shut-off device 53 that is able to move between a first position, known as the opening position, and a second position, known as the closing position. This second shut-off device 53 is in particular configured to redirect the air flow coming from the bypass 55 toward the set of heat exchangers 23 in its opening position and configured to shut-off the second inlet 42*b* in its closing position.

Thus, when the first shut-off device 52 is in its evacuation position and the second shut-off device 53 is in its closing position, only the air flow F coming from the first inlet 42*a* can pass through the set of heat exchangers 23, as illustrated in FIG. 3. Conversely, when the first shut-off device 52 is in its recirculation position and the second shut-off device 53 is in its opening position, the air flow F coming from the bypass 55 can pass through the set of heat exchangers 23, as illustrated in FIG. 4.

Preferably, when the second shut-off device 53 is in its opening position, the front face shut-off device 56 is in its shut-off position. When the second shut-off device 53 is in its closing position, the front face shut-off device 56 is in its open position.

This second shut-off device 53 can for example be a flag flap as illustrated in FIGS. 3 and 4. It can also be another type of flap known to those skilled in the art and able to perform the same function, such as for example a flap known as a butterfly flap or else a drum flap.

Thus, it is clear that the present invention, due to the presence of this bypass 55 and of the first shut-off device 52, makes it possible to recirculate an air flow F that has been heated at the second heat exchanger 26 in order to melt frost that has formed on the first heat exchanger 24 when the latter operates in heat pump mode.

What is claimed is:

1. A cooling module for an electric or hybrid motor vehicle, said cooling module being configured to have an air flow passing through it and comprising:
    a set of heat exchangers having a first heat exchanger configured to absorb heat energy from the air flow and a second heat exchanger configured to release heat energy into the air flow;
    a first header housing disposed downstream of the set of heat exchangers in a direction of circulation of the air flow, said first header housing having an outlet for the air flow;
    a tangential-flow turbomachine configured to generate the air flow;
    an air evacuation assembly disposed downstream of the outlet for the air flow of the first header housing, said air evacuation assembly emerging outside the vehicle; and
    a bypass connecting the outlet for the air flow to an opening emerging upstream of the set of heat exchangers,
    wherein the air evacuation assembly comprises an evacuation opening emerging outside the vehicle, a recirculation opening that opens into the bypass, and a first shut-off device that is able to move between a first position, known as an evacuation position, and a second position, known as a recirculation position,
    said first shut-off device being configured to prevent the air flow from entering the bypass and redirect the air flow coming from the outlet toward the outside of the vehicle in its evacuation position by shutting off the recirculation opening and to prevent the air flow from emerging outside the vehicle through the evacuation opening and redirect the air flow toward the bypass in its recirculation position by shutting off the evacuation opening.

2. The cooling module as claimed in claim 1, wherein in the evacuation position, the first shut-off device shuts off the bypass.

3. The cooling module as claimed in claim 1, further including a second header housing disposed upstream of the set of heat exchangers, said second header housing having a first inlet for the air flow coming from outside the vehicle and a second inlet for the air flow coming from the bypass forming the opening of the bypass.

4. The cooling module as claimed in claim 3, wherein the second inlet of the second header housing has a second shut-off device that is able to move between a first position, known as an opening position, and a second position, known as a closing position, the second shut-off device being configured to redirect the air flow coming from the bypass toward the set of heat exchangers in its opening position and configured to shut off the second inlet in its closing position.

5. The cooling module as claimed in claim 3, wherein the first inlet for the air flow of the second header housing has a front face shut-off device that is able to move between a first position, known as an open position, and a second position, known as a shut-off position, the front face shut-off device being configured to allow the air flow coming from outside the vehicle to pass through said first inlet in its open position and shut off said first inlet in its shut-off position.

6. The cooling module as claimed in claim 1, wherein the set of heat exchangers has a third heat exchanger configured to release heat energy into the air flow.

7. The cooling module as claimed in claim 6, wherein the third heat exchanger is disposed upstream of the first heat exchanger.

8. The cooling module as claimed in claim 1, wherein the second heat exchanger is disposed downstream of the first heat exchanger.

9. The cooling module as claimed in claim 1, wherein the first header housing has at least one discharge flap disposed facing the set of heat exchangers along an axis of circulation of the air flow passing through the cooling module.

10. The cooling module as claimed in claim 1, wherein the air evacuation assembly is disposed along a same axis as the outlet for the flow of air of the first header housing.

\* \* \* \* \*